(12) United States Patent
Giemza

(10) Patent No.: US 12,270,176 B2
(45) Date of Patent: Apr. 8, 2025

(54) ANCHOR SYSTEM

(71) Applicant: GRIPPLE LIMITED, Sheffield (GB)

(72) Inventor: Lee Giemza, Sheffield (GB)

(73) Assignee: GRIPPLE LIMITED (GB)

( * ) Notice: Subject to any disclaimer, the term of this patent is extended or adjusted under 35 U.S.C. 154(b) by 95 days.

(21) Appl. No.: 17/924,144

(22) PCT Filed: May 13, 2021

(86) PCT No.: PCT/IB2021/054098
§ 371 (c)(1),
(2) Date: Nov. 9, 2022

(87) PCT Pub. No.: WO2021/240285
PCT Pub. Date: Dec. 2, 2021

(65) Prior Publication Data
US 2023/0272590 A1 Aug. 31, 2023

(30) Foreign Application Priority Data

May 26, 2020 (GB) .................................... 2007803
May 5, 2021 (GB) .................................... 2106411

(51) Int. Cl.
*E02D 5/80* (2006.01)
*D07B 1/18* (2006.01)
(Continued)

(52) U.S. Cl.
CPC ............... *E02D 5/80* (2013.01); *E02D 5/803* (2013.01); *D07B 1/18* (2013.01); *D07B 1/185* (2013.01); *E02D 17/202* (2013.01); *E04H 17/08* (2013.01)

(58) Field of Classification Search
CPC ......... E02D 5/80; E02D 5/803; E02D 17/202; E04H 12/20; E04H 17/08; E04H 17/23; A01G 17/04; D07B 1/18; D07B 1/185
See application file for complete search history.

(56) References Cited

U.S. PATENT DOCUMENTS 600,401 A * 3/1898 Brisbin .................. E04H 17/08
256/37
610,184 A * 9/1898 Hill .......................... E02D 5/80
52/166

(Continued)

FOREIGN PATENT DOCUMENTS

| EP | 1477613 A1 | 11/2004 |
|---|---|---|
| EP | 2734690 A1 | 5/2014 |
| GB | 2514004 A | 11/2014 |

*Primary Examiner* — Omar F Hijaz
(74) *Attorney, Agent, or Firm* — Clark Hill PLC; James R. Foley

(57) ABSTRACT

An anchor system (10) comprises an anchor (16) and a tendon arrangement (18). The anchor (16) has an attaching formation (22) to attach the tendon arrangement (18) to the anchor (16). The tendon arrangement (18) extends from the attaching formation (22) as first and second passes (28, 30) of the tendon arrangement (18). The tendon arrangement (18) has opposite first and second end portions (24A, 26A). The system further includes a joining arrangement (32, 34) to join the first and second end portions (24A, 26A) to each other. The tendon arrangement (18) comprises a looped region (36) through which a securing article (38) can extend. The tendon arrangement (18) extends from the attaching formation (22) to the looped region (36).

14 Claims, 10 Drawing Sheets

(51) Int. Cl.
*E02D 17/20* (2006.01)
*E04H 17/08* (2006.01)

(56) References Cited

U.S. PATENT DOCUMENTS

| | | | | |
|---|---|---|---|---|
| 1,546,798 A * | 7/1925 | Seagren | ............... | F16G 11/046 |
| | | | | 24/129 B |
| 2,712,864 A * | 7/1955 | Clevett, Jr. | ............. | E02D 5/803 |
| | | | | 52/166 |
| 3,080,024 A * | 3/1963 | Clevett | .................. | E02D 5/803 |
| | | | | 52/155 |
| 3,139,163 A | 6/1964 | Haller | | |
| 3,449,874 A * | 6/1969 | Beaupre | .................... | E04H 9/14 |
| | | | | 52/166 |
| 3,949,527 A * | 4/1976 | Double | .................. | E02D 5/803 |
| | | | | 52/DIG. 9 |
| 4,319,428 A * | 3/1982 | Fox | ....................... | A01G 17/04 |
| | | | | 47/42 |
| 4,400,114 A * | 8/1983 | Pickett | ..................... | E02D 5/80 |
| | | | | 405/303 |
| 4,953,576 A * | 9/1990 | Connelly | .............. | E04H 15/322 |
| | | | | 135/905 |
| D334,168 S * | 3/1993 | Baker | ......................... | D12/317 |
| 5,461,833 A * | 10/1995 | Murray | .................... | E02D 5/74 |
| | | | | 248/156 |
| 6,238,143 B1 * | 5/2001 | Zablonski | ............... | E02D 5/803 |
| | | | | 405/259.1 |
| 6,757,945 B2 * | 7/2004 | Shibuya | .............. | A47G 27/0418 |
| | | | | 16/8 |
| 7,353,833 B1 * | 4/2008 | Palmer | .................... | E04H 15/62 |
| | | | | 135/120.4 |
| 8,920,084 B2 * | 12/2014 | Dahl | ...................... | F16G 11/14 |
| | | | | 410/96 |
| 9,624,639 B2 * | 4/2017 | Somerfield | .............. | E02D 5/80 |
| 10,351,082 B2 * | 7/2019 | Kim | .................. | A44B 13/0088 |
| 2010/0001242 A1 * | 1/2010 | Moffat | .................... | E02D 5/801 |
| | | | | 254/263 |
| 2019/0387692 A1 | 12/2019 | Fitzsimons et al. | | |

* cited by examiner

ANCHOR SYSTEM

This invention relates to anchor systems. More particularly, but not exclusively, this invention relates to anchor systems comprising ground anchors.

It is known to secure posts and other articles to the ground using ground anchors, for example in the support of vineyard trellises. The articles are attached to the anchor by cables. However, there is a tendency for the cables to corrode. Often, the components of the vineyard trellis can be made from dissimilar metals which can worsen deterioration of the ground anchor and the cable.

According to one aspect of the invention, there is provided an anchor system comprising:
an anchor and a tendon arrangement;
the anchor having an attaching formation to attach the tendon arrangement to the anchor, the tendon arrangement extending from the attaching formation as first and second passes of the tendon arrangement;
wherein the tendon arrangement has opposite first and second end portions;
the system further including a joining arrangement to join the first and second end portions to each other; and
wherein the tendon arrangement comprises a looped region through which a securing article can extend, the tendon arrangement extending from the attaching formation to the looped region.

The first and second end portions may extend along each other. The first and second passes of the tendon arrangement may extend from the attaching formation to the looped region.

According to another aspect of the invention, there is provided an anchor system comprising:
an anchor and a tendon arrangement;
the anchor having an attaching formation to attach the tendon arrangement to the anchor, the tendon arrangement extending from the attaching formation as first and second passes of the tendon arrangement;
wherein the tendon arrangement has opposite first and second end portions extending along each other;
the system further including a joining arrangement to join the first and second end portions to each other; and
wherein the tendon arrangement comprises a looped region through which a securing article can extend, the first and second passes extending from the attaching formation to the looped region.

The tendon arrangement may comprise an elongate member, which may extend through the attaching formation to provide the first and second passes.

According to another aspect of the invention, there is provided an anchor system comprising:
an anchor and an elongate member;
the anchor having an attaching formation to attach the elongate member to the anchor, the elongate member extending through the attaching formation to provide first and second passes of the elongate member extending from the attaching formation;
wherein the elongate member has opposite first and second end portions extending along each other;
the system further including a joining arrangement to join the first and second end portions to each other; and
wherein the elongate member comprises a looped region through which a securing article can extend, the first and second passes extending from the attaching formation to the looped region.

The joined first and second end portions may provide the looped region. The securing article may be an elongate securing article, such as a cable, wire, or wire rope.

The attaching formation may comprise an apertured formation. The anchor may have a body. The apertured formation may be provided on the body. The apertured formation may comprise an eye. The body may enable the anchor to be driven into the ground.

The first and second passes of the elongate member may be substantially the same length as each other. The looped region may be the joined end portions of the elongate member.

The joining arrangement may comprise first and second joining components for joining the first and second end portions to each other. The first and second end portions may be arranged in an overlapping configuration, in which the first and second end portions overlap each other.

The first end portion may extend from a first end of the elongate member, and the first joining component may be disposed adjacent the first end of the elongate member. The second end portion may extend from a second end of the elongate member, and the second joining component may be disposed adjacent the second end of the elongate member.

According to another aspect of the invention, there is provided an anchor system comprising:
an anchor and an elongate member;
the anchor having an attaching formation in the form of an apertured formation to attach the elongate member to the anchor, the elongate member extending through the apertured formation to provide first and second passes of the elongate member;
wherein the elongate member has opposite first and second end portions extending from opposite directions to overlap each other, the first end portion being provided at a first end of the elongate member, and the second end portion being provided at a second end of the elongate member;
the system further including first and second joining components for joining the overlapping first and second end portions to each other, the first joining component being disposed adjacent the first end of the elongate member, and the second joining component being disposed adjacent the second end of the elongate member; and
wherein the joined end portions of the elongate member provide a looped region through which a securing article can extend, the first and second passes of the elongate member being substantially the same length as each other and the first and second passes extending from the apertured formation to the looped region.

According to another aspect of this invention, there is provided a support assembly comprising an anchor system as described above, a support and a securing article to secure the support to the anchor system.

The anchor may comprise a ground anchor.

The anchor system may include protecting means. The protecting means may be mounted in the attaching formation.

The protecting means may comprise a protecting member. The protecting means may comprise first and second protecting members. Each of the first and second protecting members may be received in a respective opposite side of the attaching formation.

The, or each, protecting member may comprise a bush. The, or each, protecting member may define a through hole. The, or each, protecting member may be received within the attaching formation to receive the elongate member therethrough. The elongate member may extend through the hole.

The, or each, protecting member may comprise a main part, which may be substantially cylindrical. The main part may have opposite ends. The hole may extend between the opposite ends.

The, or each, protecting member may comprise a projecting part. The projecting part may extend outwardly from the main part. The projecting part may comprise a flared portion. The projecting part may comprise a flange. The projecting part may define a concave recess. The hole may have an opening in the recess.

The projecting part may extend outwardly from one end of the main part. The opposite end of the, or each, protecting member may be received by the attaching formation.

The, or each, protecting member may comprise mounting formations for mounting the protecting member in the aperture. The mounting formations may extend along the main part. The mounting formations may extend across the projecting part. The mounting formations may comprise ribs.

The first pass may include the first end portion of the elongate member. The second pass may include the second end portion of the elongate member.

The second end portion may extend across the first end. The first end portion may extend across the second end.

The first end may be arranged adjacent the second pass. The second end may be arranged adjacent the first pass. The first pass may extend across the second end. The second pass may extend across the first end.

The looped region may comprise the overlapping first and second end portions. The first end may be arranged adjacent the second end portion. The second end may be arranged adjacent the first end portion.

The first and second joining components may comprise respective first and second clamping components. The first and second joining components may comprise respective first and second ferrules.

The elongate member may be formed of a non-corrosive material, which may be chemically resistant. The elongate member may be formed of a non-metallic material. The elongate member may be formed of a synthetic material. The elongate member may be formed of polymeric material, such as polyester.

Alternatively, the elongate member may be formed of a metallic material, such as stainless steel.

The elongate member may be a flexible elongate member. The elongate member may be a multifilament member, which may have an outer braid. The elongate member may have structural properties.

The support may be an elongate support, such as a post. The securing article may comprise an elongate tether. The elongate tether may be flexible.

The securing article may extend through the looped region to secure the support to the anchor system.

The securing article may extend from a first location on the support through the looped region, and from the looped region to a second location on the support, thereby securing the support to the anchor system. The first location may be an upper location of the support. The second location may be a lower location of the support.

An embodiment of the invention will now be described by way of example only with reference to the accompanying drawings, in which.

Figure 1:
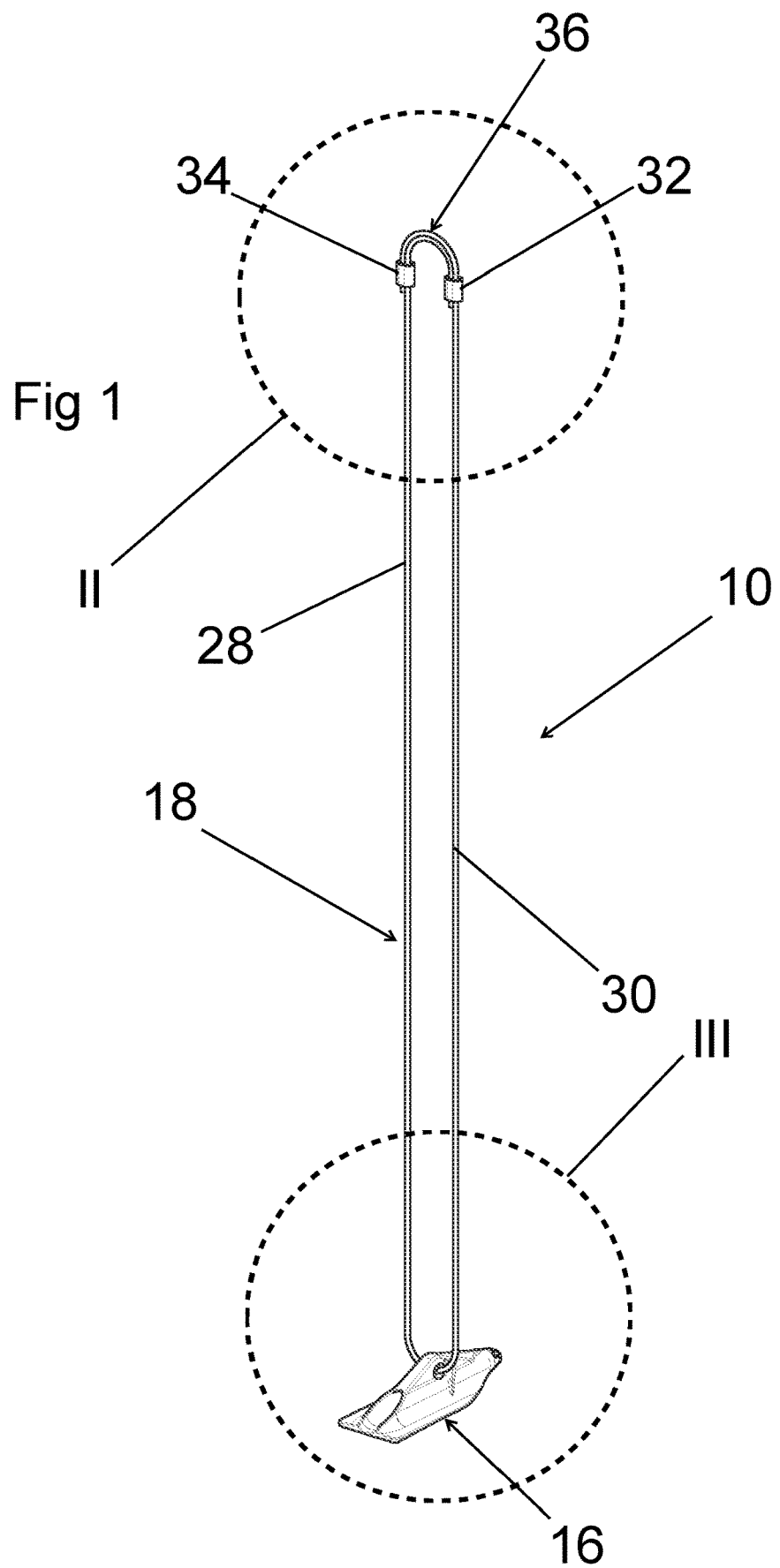
FIG. 1 is a perspective view of an anchor system, comprising an anchor and a tendon arrangement.
Figure 2:
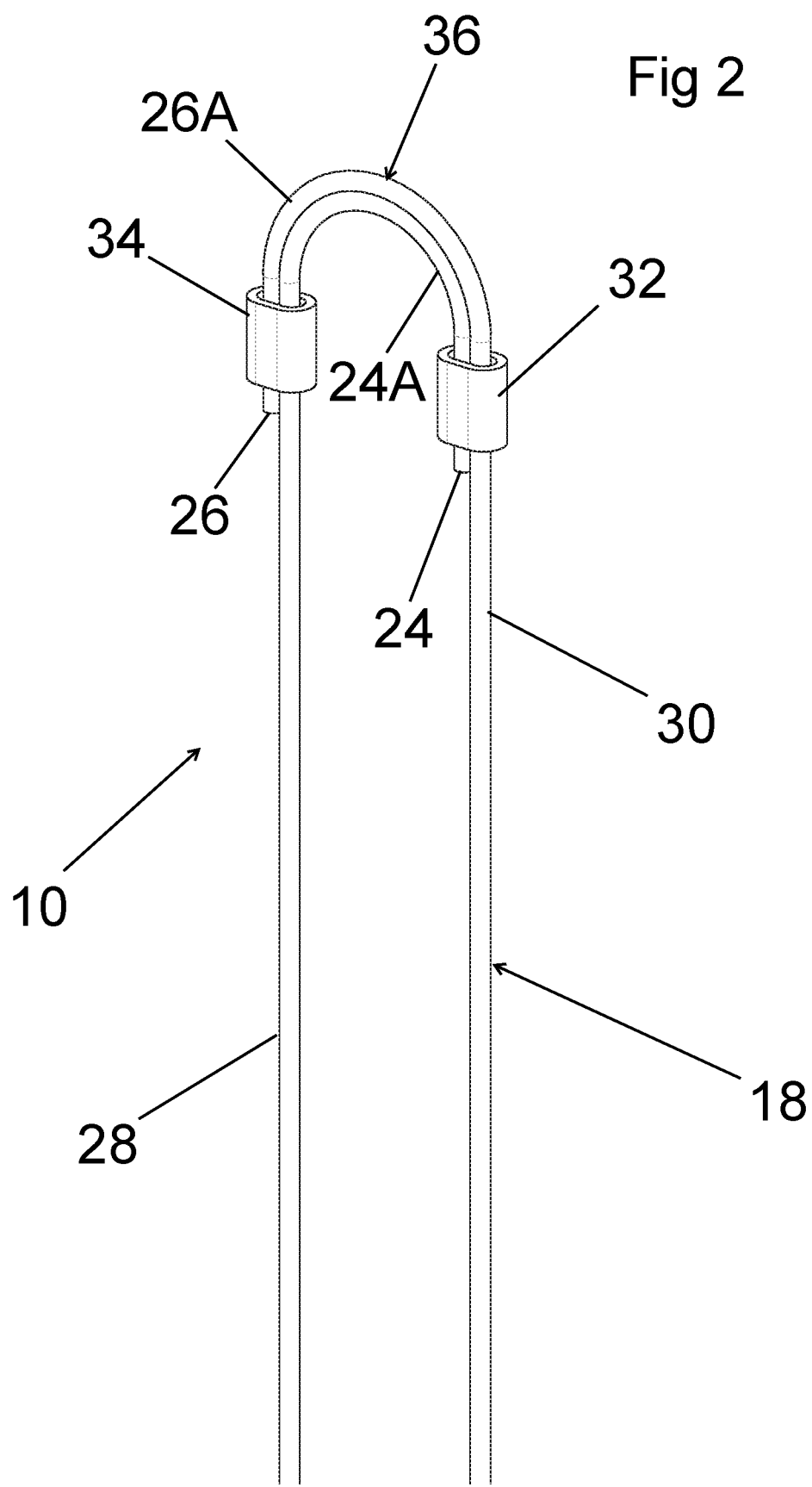
FIG. 2 is a close up of the region marked II in FIG. 1.
Figure 3:
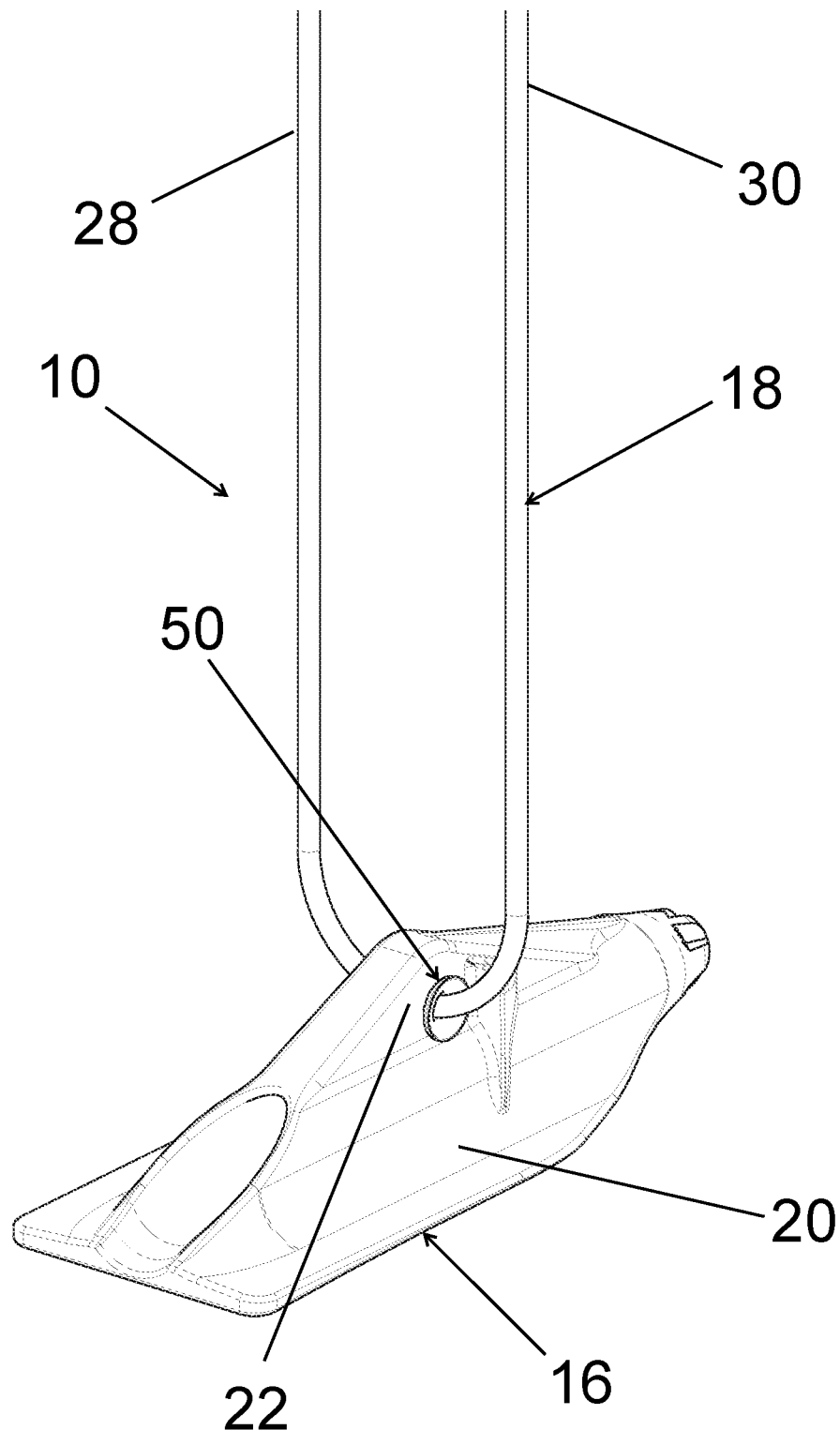
FIG. 3 is a close up of the region marked III in FIG. 1.
Figure 4:
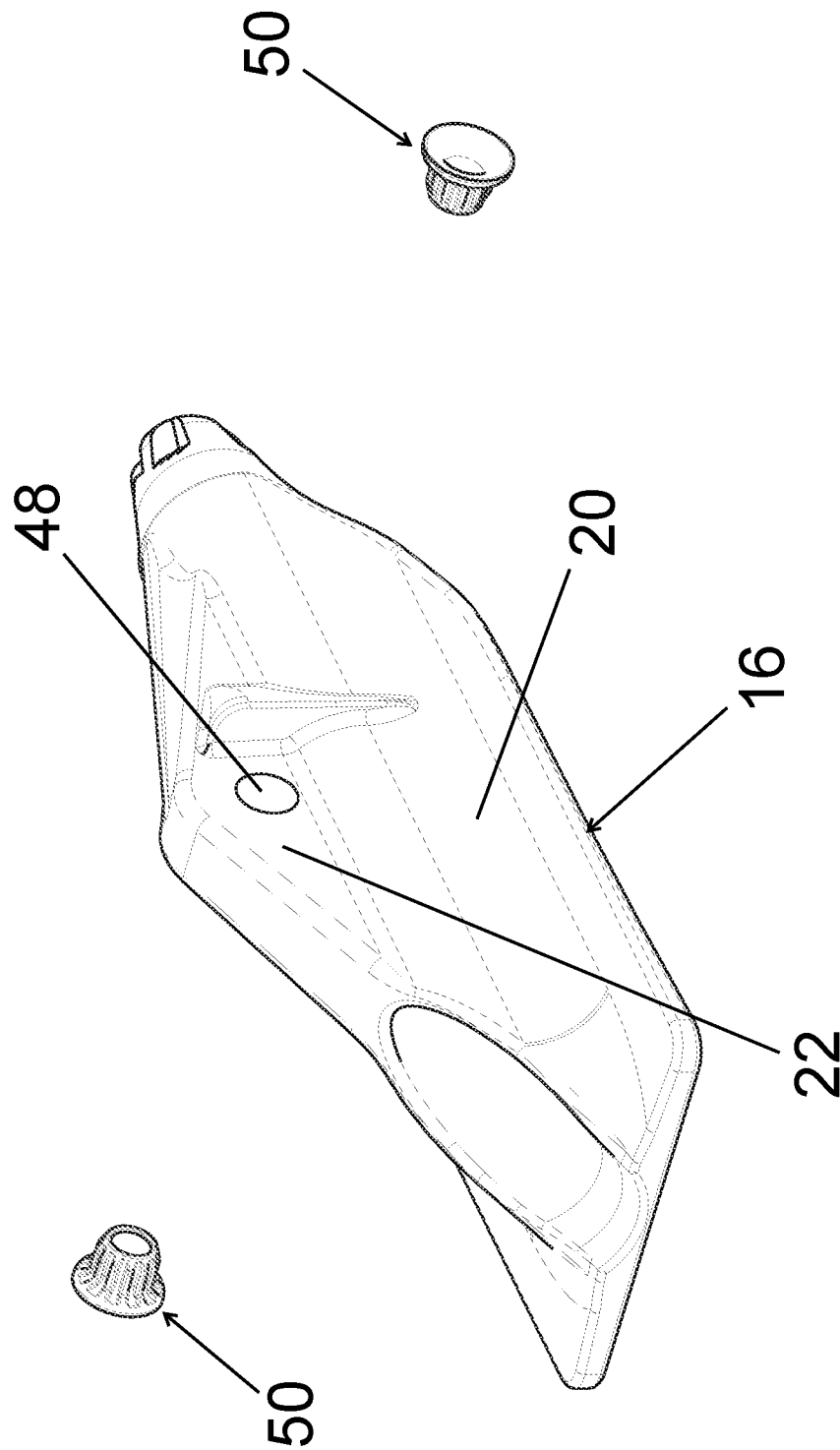
FIG. 4 is an exploded view showing the anchor and two protecting members.
Figure 5:
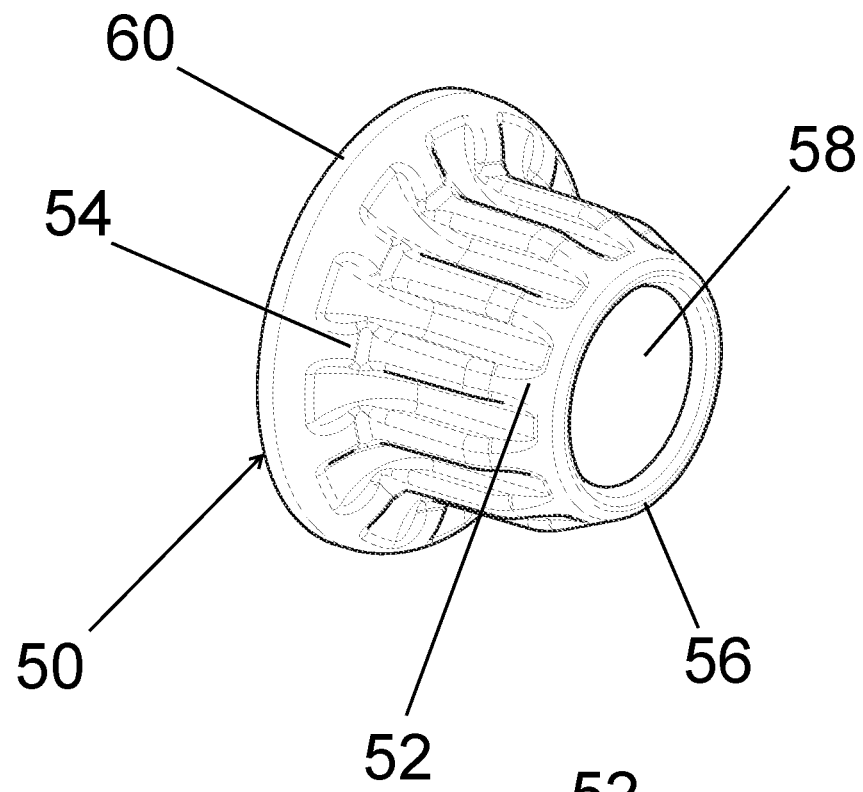
FIG. 5 is a view of one of the protecting members from a first direction.
Figure 6:
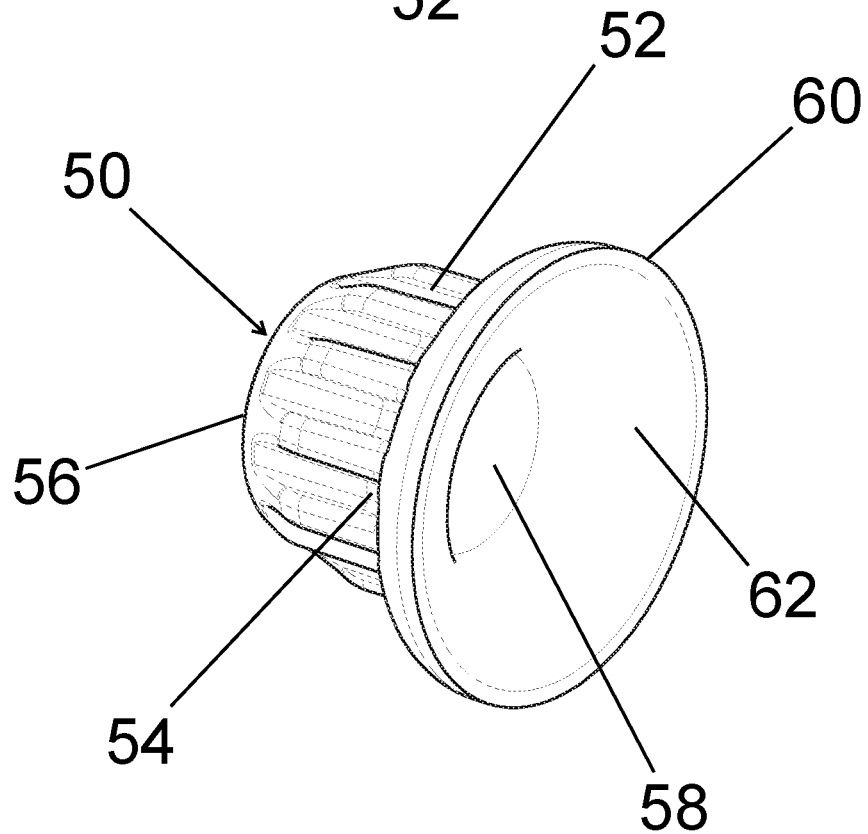
FIG. 6 is a view of the protecting member shown in in FIG. 5 from a second direction.
Figure 7:
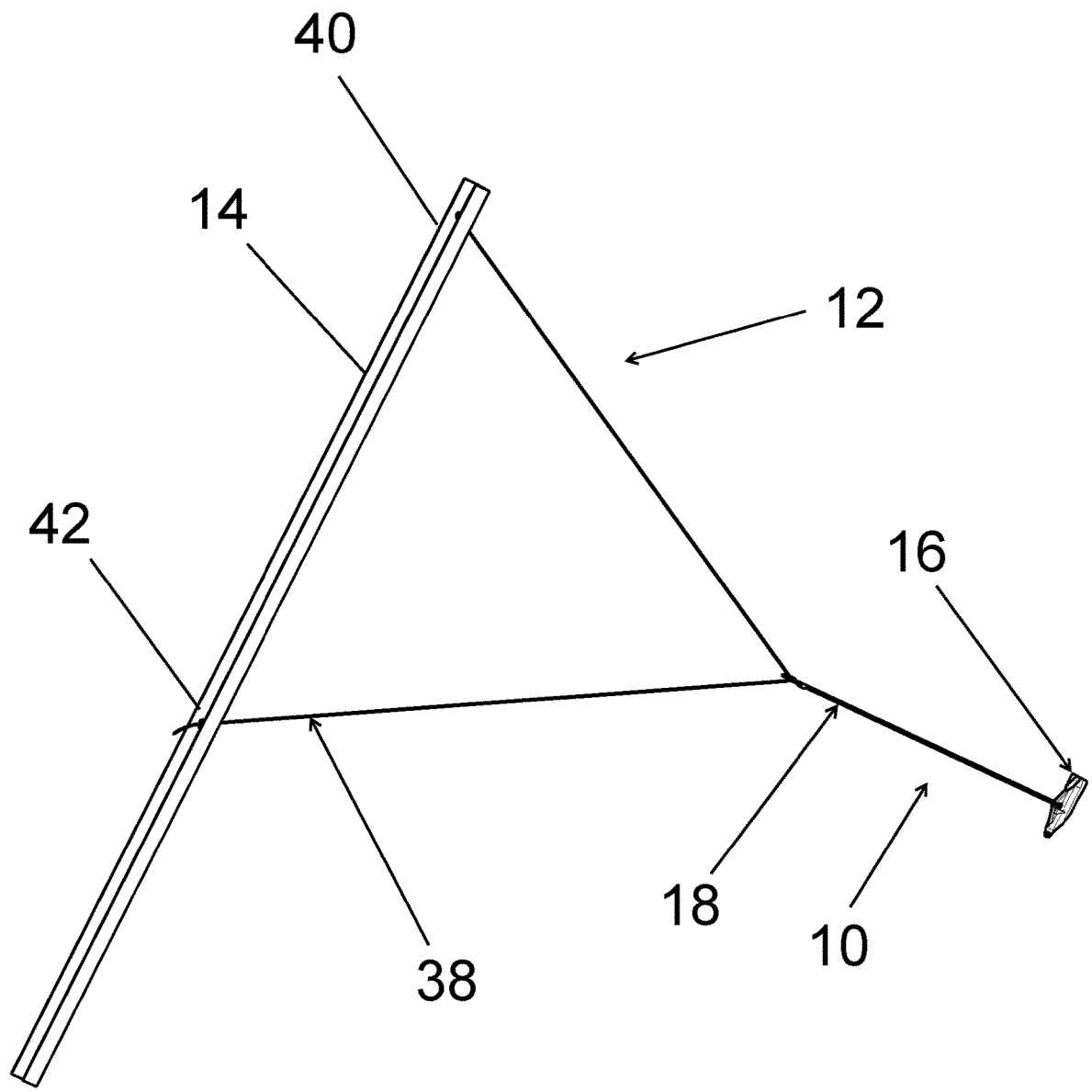
FIG. 7 is a side view of a support assembly comprising the anchor system and a support.
Figure 8:
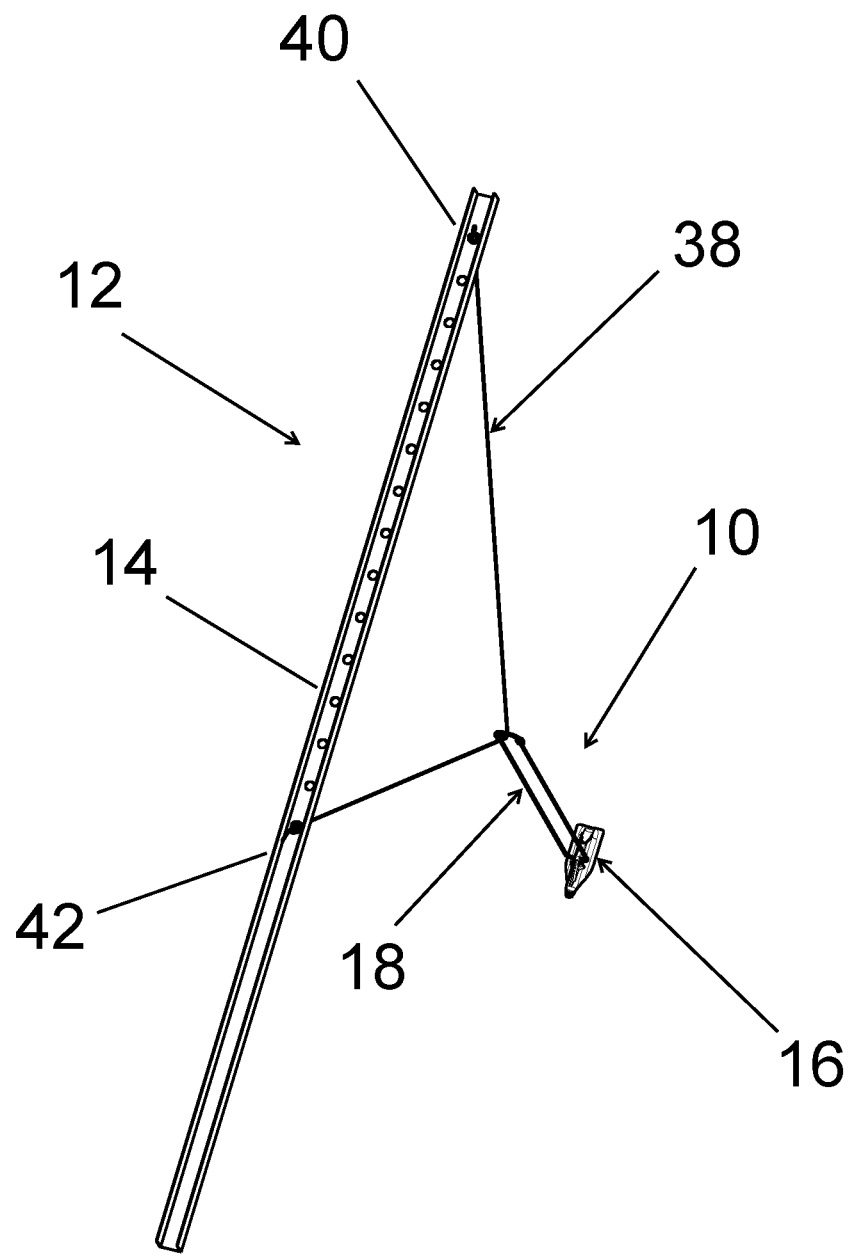
FIG. 8 is a front perspective view of the support assembly.

FIGS. 1 to 6 show an anchor system 10 for use in securing articles to the ground. For example, the anchor system 10 can be used in a support assembly 12, in which the anchor system 10 supports a post 14 which, in turn, supports a trellis, such as a vineyard trellis. The anchor system 10 comprises a ground anchor 16 and a tendon arrangement attached to the ground anchor 16.

The tendon arrangement is in the form of a flexible elongate member 18 having structural properties. The elongate member 18 is formed of a non-metallic, non-corrosive material, such as a chemically resistant synthetic material. The elongate member 18 is a multifilament member, having an outer braid.

The elongate member 18 is formed of a polymeric material, such as polyester.

The ground anchor 16 may be one known in the art, such as disclosed in published patent application No. GB 2514004 A. The ground anchor 16 comprises a body 20 that enables the ground anchor 16 to be driven into the ground.

The ground anchor 16 further includes an attaching formation comprising an apertured formation in the form of an eye 22 on the body 20. The eye 22 defines an aperture 48. Protecting members in the form of first and second bushes 50 are provided in the aperture 48.

Each of the first and second bushes 50 is received in the aperture 48 at a respective opposite side of the eye 22.

Each of the bushes 50 comprises a substantially cylindrical main part 52, having opposite ends 54, 56. Each bush 52 defines a through hole 58 extending through the main part 52. The opposite ends 54, 56 have openings of the hole 58.

When the bushes 50 are received in the aperture 48, the elongate member 18 can extend through the hole 58 of each bush 50.

Each bush 50 has a flange 60. The flange 60 extends radially outwardly from the main part 52 at one of the opposite ends 54. The flange 60 defines a concave recess 62. One of the openings of the hole 58 is defined in the recess 62.

Each bush 50 comprises mounting ribs 64 for mounting the bush 50 in the aperture 48. The ribs 64 deform when the bush 50 is pushed into the aperture 48 of the eye 22. The presence of the ribs 64 has the effect of mounting the bush 50 in the aperture 48 more securely than without such ribs.

The ribs 64 extend along the main part 52 and across the flange 60. The bushes 50 are inserted into the aperture 48 in an orientation in which the end 56 is received in the aperture 48, and the flange 60 projecting therefrom. Thus, the elongate member 18 extends from the aperture 48 at opposite sides of the eye 22.

The bush 23 is formed of a plastics material and has the effect of minimising wear on the elongate member 18. The flanges 60 of both bushes 50 protect the elongate member 18 from the corners of the aperture 48. In addition, the bush 23 creates a non-conductive barrier between the elongate member 18 and the ground anchor 16, thereby allowing the elongate member 18 to be formed of a metallic material, such as stainless steel, instead of a polymeric material.

The elongate member 18 has opposite first and second ends 24, 26. First and second end portions 24A, 26A extend respectively from the first and second ends 24, 26.

In use, the elongate member 18 extends through the eye 22 on the body 20. First and second passes 28, 30 of the elongate member 18 extend from the eye 22.

The first and second passes 28, 30 are attached to each other in an overlapping configuration at the first and second end portions 24A, 26A. The first end 24 and the first end portion 24A are provided on the first pass 28. The second end 26 and the second end portion 26A are provided on the second pass 30.

In the overlapping configuration, the first end 24 is arranged adjacent the second end portion 26A, and the second end 26 is arranged adjacent the first end portion 24A. The first end portion 24A extends from the first end 24 across the second end 26, and the second end portion 26A extends from the second end 26 across the first end 24.

The first and second end portions 24A, 26A of the elongate member 18 are joined to each other in the overlapping configuration by a joining arrangement. In the embodiment shown, the joining arrangement comprises first and second ferrules 32, 34. The joining arrangement may be other suitable clamping components.

The first ferrule 32 is provided adjacent the first end 24 of the elongate member 18, between the first end 24 and the second ferrule 34. The second ferrule 34 is provided adjacent the second end 26 of the elongate member 18, between the second end 26 and the first ferrule 32.

The joined first and second end portions 24A, 26A of the elongate member 18 form a looped region 36 of the elongate member 18.

The anchor system 10 forms part of the support assembly 12, shown in FIGS. 7 to 11. The support assembly 12 comprises the anchor system 10, an elongate support in the form of the post 14, and an elongate tether 38.

The elongate tether 38 extends from an upper location 40 of the post 14 through the looped region 36 of the elongate member 18, and from the looped region 36 to a lower location 42 of the post 14.

The post 14 defines a plurality of apertures along its length. The tether 38 extends through the apertures at the upper and lower locations 40, 42 of the post 14 and is secured to the post 14 by any means known in the art.

Figure 10:
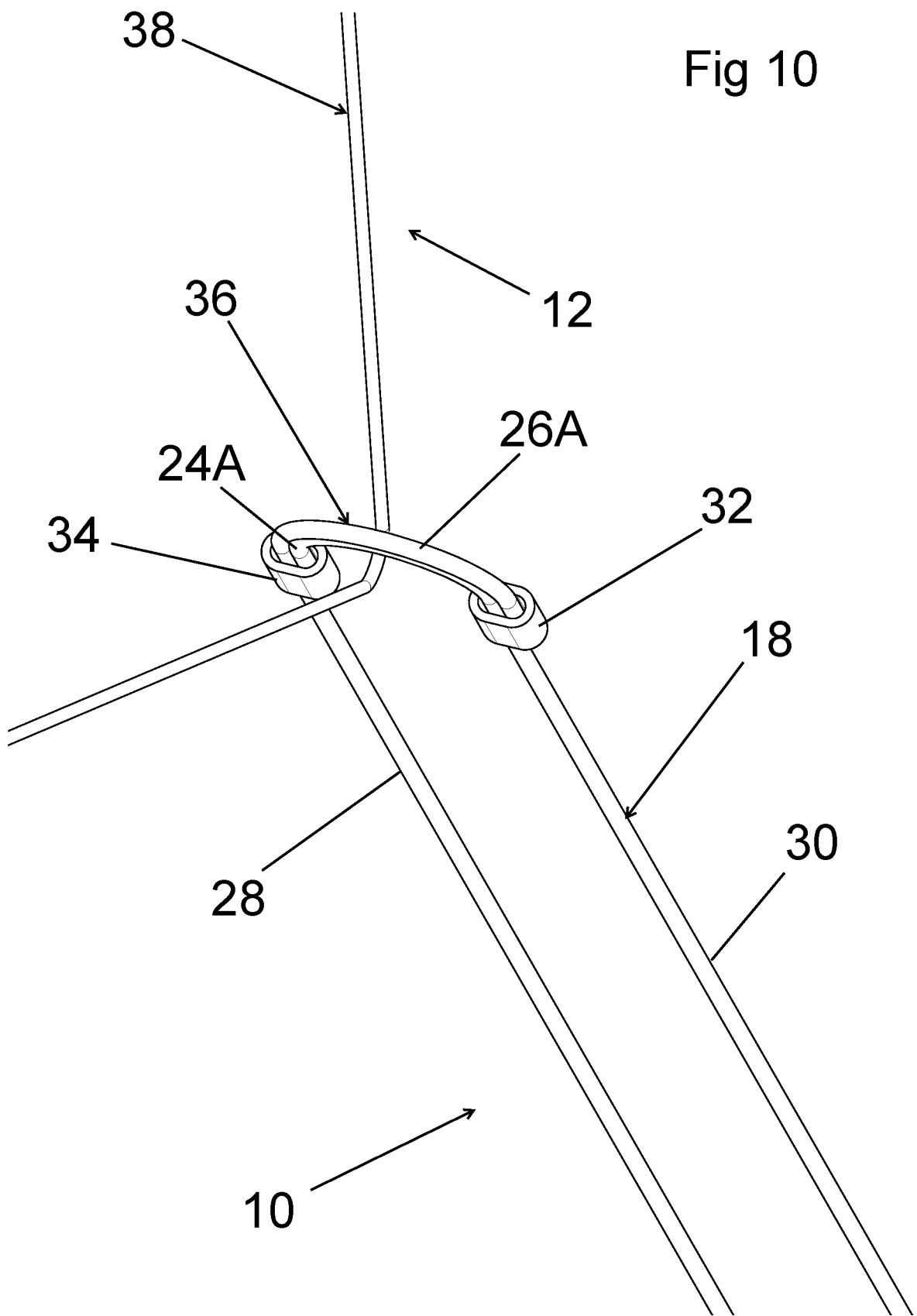
FIG. 10 is a front perspective view of the region marked VII in FIG. 6.
Figure 11:
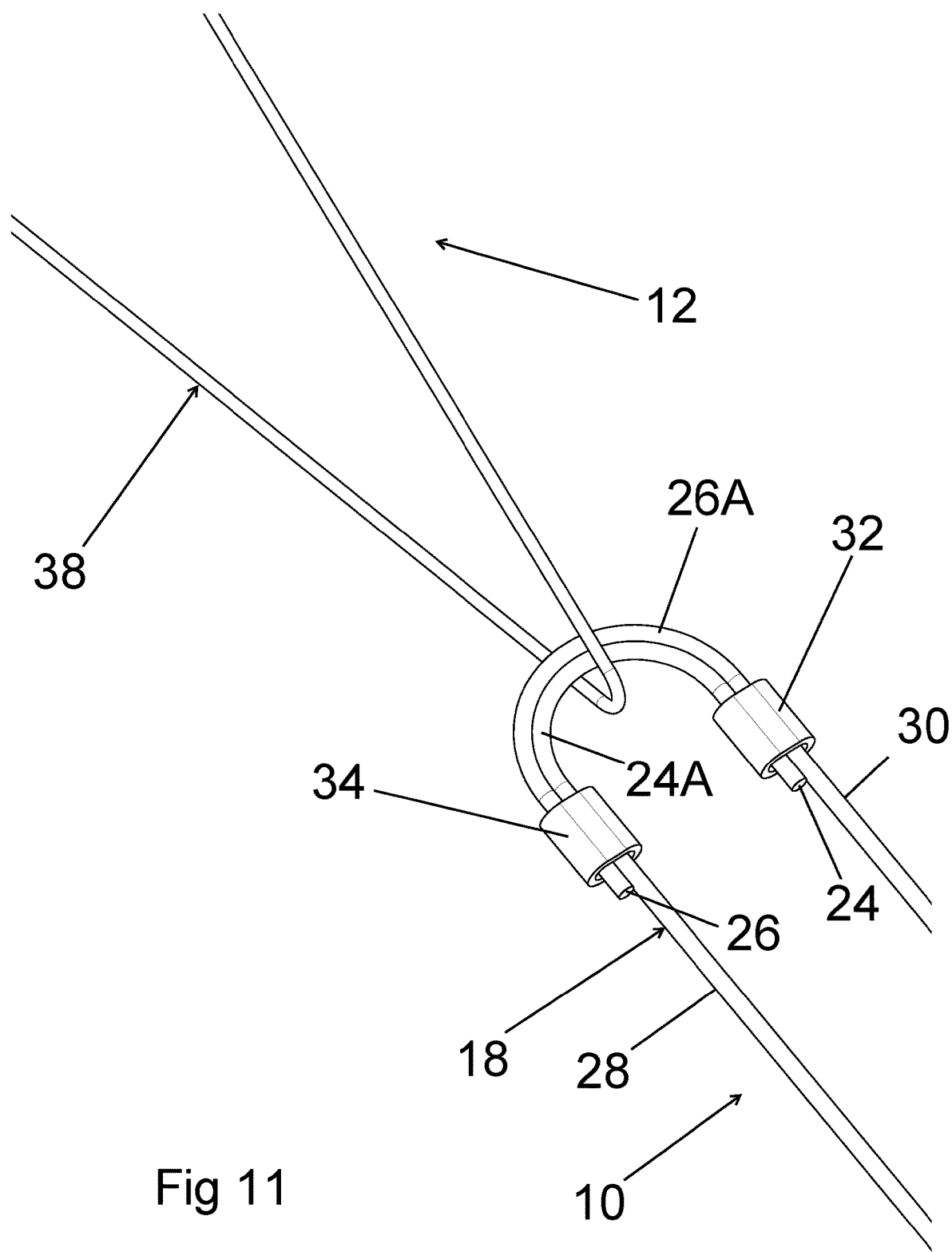
FIG. 11 is a rear perspective view of the region marked VII in FIG. 6.

As shown in FIGS. 10 and 11, the tether 38 extends through the looped region 36 of the elongate member 18, and is pulled tightly against the overlapping first and second end portions 24A, 26A at the looped region 36.

FIGS. 10 and 11 show the tether 38 spaced from the looped region 36. The tether 38 and the looped region 36 are shown this way for clarity. In reality, the tether 38 engages the looped region 36 tightly.

Figure 9:
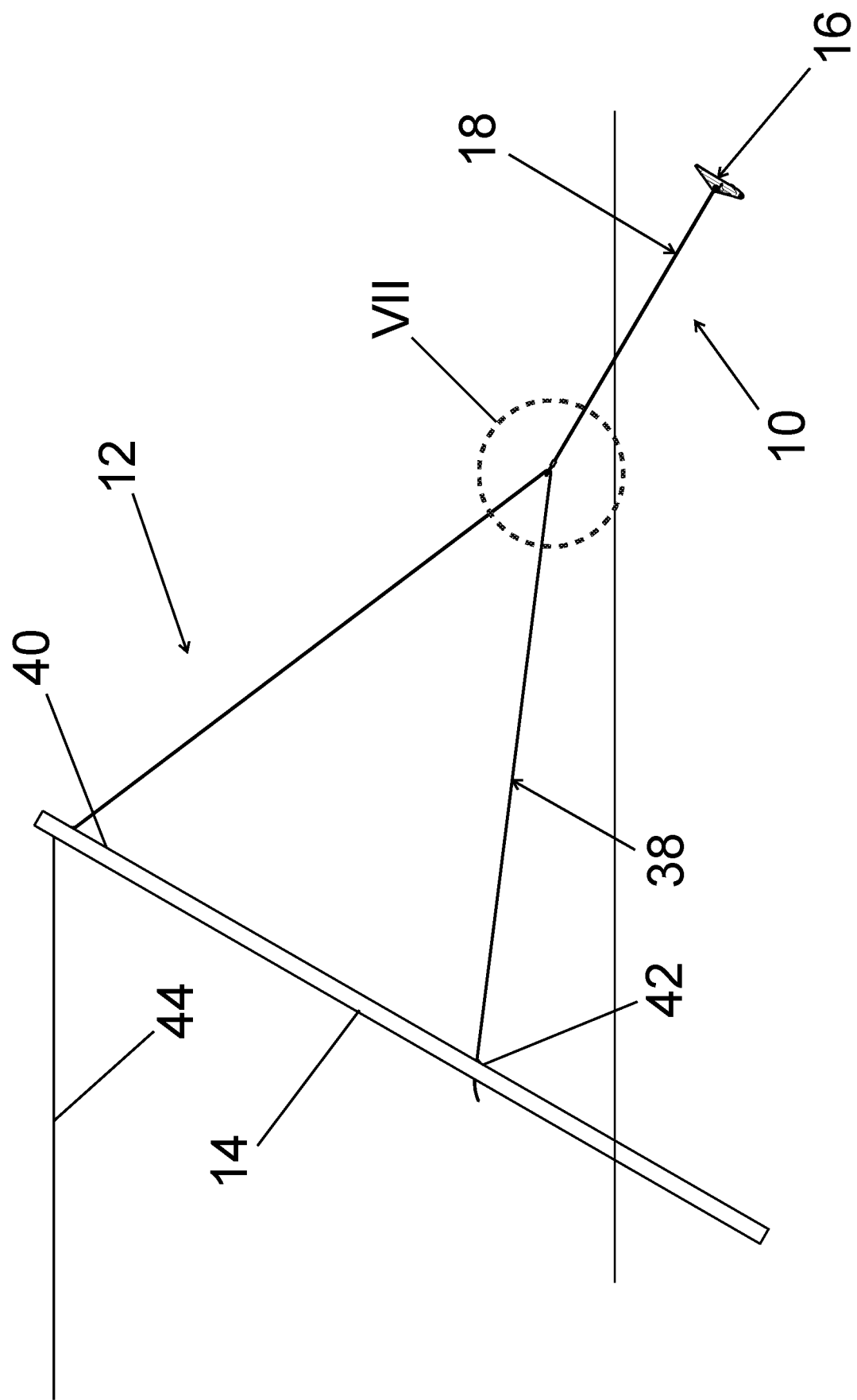
FIG. 9 is a side view showing the support assembly in the ground.

In use, the support assembly 12 supports a trellis, such as a vineyard trellis, represented in FIG. 9 by the wire 44.

There is thus described an anchor system 10 having an anchor 16 and an elongate member 18 attached to the anchor 16. The elongate member 18 extends in two passes 28, 30 from the elongate member 18, wherein the opposite end portions 24A, 26A of the elongate member 18 are secured to each other in an overlapping configuration.

This provides the advantage in the embodiment described herein that the load on the elongate member 18 can be twice as much as the load on a single pass. In addition, by making the elongate member 18 from a non-metallic material, corrosion of the elongate member 18 in the ground can be avoided.

In addition, by providing the looped region 36 above the ground, the first and second ferrules 32, 34 are also above the ground, thereby obviating the corrosive effects of the ground on the ferrules.

A further advantage of the overlapping first and second end portions 24A, 26A in the embodiment described above is that excessive wear to any one part of the looped region 36 is prevented thereby making the anchor system 10 stronger than prior art systems.

Various modifications can be made without departing from the scope of the invention.

The invention claimed is:

1. A support assembly comprising an anchor system, a support and a securing article to secure the support to the anchor system;

the anchor system comprising:

an anchor and a tendon arrangement;

the anchor having an attaching formation to attach the tendon arrangement to the anchor, the tendon arrangement extending from the attaching formation as first and second passes of the tendon arrangement;

wherein the tendon arrangement has opposite first and second end portions;

the system further including a joining arrangement to join the first and second end portions to each other; and wherein the tendon arrangement comprises a looped region through which a securing article can extend, the tendon arrangement extending from the attaching formation to the looped region;

wherein the tendon arrangement comprises an elongate member extending through the attaching formation to provide the first and second passes; and the anchor system includes a bush defining a through hole, the bush being received within the attaching formation to receive the elongate member therethrough, and the elongate member extending through the hole.

2. A support assembly according to claim 1, wherein the first and second passes of the tendon arrangement extend along each other from the attaching formation to the looped region.

3. A support assembly according to claim 1, wherein the attaching formation comprises an apertured formation, and the anchor has a body, the apertured formation being provided on the body.

4. A support assembly according to claim 1, wherein the joining arrangement comprises first and second joining components for joining the first and second end portions to each other, the first and second end portions being arranged in an overlapping configuration, in which the first and second end portions overlap each other.

5. A support assembly according to claim 4, wherein the first and second joining components comprise first and second ferrules.

6. A support assembly according to claim 1, wherein the first end portion extends from a first end of the tendon arrangement, the first joining component being disposed adjacent the first end of the tendon arrangement; and wherein the second end portion extends from a second end of the tendon arrangement, and the second joining component being disposed adjacent the second end of the tendon arrangement.

7. A support assembly according to claim 1, wherein the first pass includes the first end portion of the tendon arrangement, and the second pass includes the second end portion of the tendon arrangement, the second end portion extending across the first end, the first end portion extending across the second end.

8. A support assembly according to claim 7, wherein the looped region comprises the overlapping first and second end portions, the first end being arranged adjacent the second end portion, and the second end being arranged adjacent the first end portion.

9. A support assembly according to claim 1, wherein the tendon arrangement is a flexible tendon arrangement.

10. A support assembly comprising an anchor system, a support and a securing article to secure the support to the anchor system;

the anchor system comprising:

an anchor and a tendon arrangement;

the anchor having an attaching formation to attach the tendon arrangement to the anchor, the tendon arrangement extending from the attaching formation as first and second passes of the tendon arrangement;

wherein the tendon arrangement has opposite first and second end portions;

the system further including a joining arrangement to join the first and second end portions to each other; and wherein the tendon arrangement comprises a looped region through which a securing article can extend, the tendon arrangement extending from the attaching formation to the looped region;

wherein the securing article extends through the looped region to secure the support to the anchor system, the securing article extending from an upper location on the support through the looped region, and from the looped region to a lower location on the support, thereby securing the support to the anchor system;

wherein the anchor system includes a bush defining a through hole, the tendon arrangement extending through the hole, and the bush being received within the attaching formation to receive the tendon arrangement therethrough.

11. A support assembly according to claim 10, wherein the bush comprises a main part having opposite ends, the hole extending between the opposite ends.

12. A support assembly according to claim 11, wherein the bush comprises a projecting part extending outwardly from the main part, the projecting part defining a concave recess, and the hole having an opening in the recess.

13. A support assembly according to claim 12, wherein the projecting part comprises a flared portion.

14. A support assembly according to claim 12, wherein the projecting part extends outwardly from one end of the main part, the opposite end of the bush being received by the attaching formation.

* * * * *